UNITED STATES PATENT OFFICE.

HORATIO N. BARROW, OF EAST WINDSOR, CONNECTICUT.

IMPROVED COMPOSITION FOR THE PASTEL-VAT TO BE USED IN DYEING.

Specification forming part of Letters Patent No. 5,947, dated December 5, 1848.

*To all whom it may concern:*

Be it known that I, HORATIO N. BARROW, a native of Great Britain, but now residing at Broadbrook, in East Windsor, of the State of Connecticut, and having taken oath of intention to become a citizen of the United States of America, and having resided in said United States for the preceding year, have invented or discovered a new composition to be used for such purpose or purposes for which pastel is commonly employed in the process of dyeing; and I do hereby declare that the same is fully described in the following specification.

Take of the stems and leaves or sprouts of the *Daucus carota* (common carrot) or *Pastinaca sativa* (common parsnip) two tons, (four thousand four hundred and eighty pounds,) and run them through a crushing-machine, so as to break and crush them, or instead of a crushing-machine any other suitable means of crushing the same may be adopted. Next, lay the whole in a heap on a board or any other proper floor in a warm place and turn and chop them and work them over with a spade or shovel, or any other proper substitute, and continue to do the same as often as about once a day for three weeks, or until fermentation has taken place throughout the heap. Next, add a pint and a half of alkali (or a pint and a half of a combination of fifteen parts of slaked lime to one of sal-ammoniac, which I have found to work to good advantage) to every two hundred pounds of the material, and thoroughly incorporate it with the mass, and occasionally work the same over until the acid of fermentation has become neutralized. The compound is then fit for use, but improves by age or being kept some time.

I do not intend to always employ the alkali in the above proportions, or a combination of alkalies, as above stated. These I have found from experience to operate well. More or less alkali may be used, as circumstances may require, and, in fact, I am led to believe that there may be some instances where, when the mass is allowed to stand exposed to the air and heat a great length of time, an alkali may be dispensed with; but by the employment of the alkali the material is brought to a state of perfection in a very short time.

I claim—

The above composition or vegetable preparation of carrot or parsnip sprouts, made substantially as set forth, and used for the above-mentioned purpose.

In testimony whereof I have hereto set my signature this 23d day of February, A. D. 1848.

HORATIO N. BARROW.

Witnesses:
 R. H. EDDY,
 CALEB EDDY.